US009216706B2

(12) United States Patent
Döring et al.

(10) Patent No.: US 9,216,706 B2
(45) Date of Patent: Dec. 22, 2015

(54) NETWORK AND METHOD FOR OPERATING A NETWORK

(75) Inventors: Martin Döring, Braunschweig (DE); Olaf Krieger, Lostau (DE); Andreas Titze, Braunschweig (DE); Henning Harbs, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 421 days.

(21) Appl. No.: 13/881,642

(22) PCT Filed: Oct. 24, 2011

(86) PCT No.: PCT/EP2011/005347
§ 371 (c)(1),
(2), (4) Date: May 17, 2013

(87) PCT Pub. No.: WO2012/055525
PCT Pub. Date: May 3, 2012

(65) Prior Publication Data
US 2013/0229054 A1     Sep. 5, 2013

(30) Foreign Application Priority Data
Oct. 27, 2010     (DE) .......................... 10 2010 049 835

(51) Int. Cl.
*B60L 1/00*     (2006.01)
*B60R 16/023*     (2006.01)
*H04L 12/10*     (2006.01)
*H04L 12/40*     (2006.01)

(52) U.S. Cl.
CPC ............ *B60R 16/0238* (2013.01); *H04L 12/10* (2013.01); *H04L 12/40045* (2013.01); *H04L 2012/40273* (2013.01)

(58) Field of Classification Search
CPC .................... B60R 16/0238; H04L 12/40045; H04L 12/10; H04L 2012/40273
See application file for complete search history.

(56) References Cited

U.S. PATENT DOCUMENTS

| 6,535,983 B1 | 3/2003 | McCormack et al. |
| 2008/0005602 A1* | 1/2008 | Diab et al. .................... 713/300 |
| 2009/0152943 A1 | 6/2009 | Diab et al. |

(Continued)

FOREIGN PATENT DOCUMENTS

| DE | 4138065 A1 | 5/1993 |
| DE | 19960471 A1 | 3/2001 |

(Continued)

OTHER PUBLICATIONS

Mendelson; All You Need to Know About Power over Ethernet (PoE) and the IEEE 802.3af Standard; Jun. 2004; http://www.powerdsine.com/Documentation/WhitePapers/PoE_and_IEEE802_3af.pdf.

(Continued)

*Primary Examiner* — Daniel Cavallari
(74) *Attorney, Agent, or Firm* — Barnes & Thornburg LLP

(57) ABSTRACT

A network, in particular in a motor vehicle, wherein the network includes a central subscriber and at least one first subscriber, wherein the central subscriber and the at least one first subscriber are connected via at least one first cable, wherein the central subscriber has at least one signal coupling unit and at least one energy coupling unit, wherein by the signal coupling unit an AC voltage can be impressed on at least one first line of the first cable or can be tapped therefrom. Also disclosed is a method for operating a network.

10 Claims, 5 Drawing Sheets

(56) References Cited

U.S. PATENT DOCUMENTS

2009/0228722 A1 9/2009 Lin
2010/0153751 A1 6/2010 Tseng et al.

FOREIGN PATENT DOCUMENTS

| DE | 102004028498 A1 | 1/2006 |
| DE | 102004046401 A1 | 4/2006 |
| DE | 102008030222 A1 | 12/2009 |
| DE | 102009039024 B3 | 4/2011 |
| WO | 2006055163 A1 | 5/2006 |

OTHER PUBLICATIONS

Search Report for German Patent Application No. 10 2010 049 835.1; Oct. 6, 2011.
Search Report for International Patent Application No. PCT/EP2011/005347; Feb. 6, 2012.

* cited by examiner

NETWORK AND METHOD FOR OPERATING A NETWORK

PRIORITY CLAIM

This patent application is a U.S. National Phase of International Patent Application No. PCT/EP2011/005347, filed 24 Oct. 2011, which claims priority to German Patent Application No. 10 2010 049 835.1, filed 27 Oct. 2010, the disclosures of which are incorporated herein by reference in their entirety.

FIELD

Disclosed embodiments relate to a network and to a method for operating a network.

BACKGROUND

Controllers in motor vehicles can communicate via various bus systems, such as CAN, MOST, FlexRay or LIN bus systems. The cited bus systems differ in terms of their properties, such as a data rate for data that are to be transmitted, connector and cable types, number of controllers that can be connected to the bus system, maximum admissible cable length, etc. Power can be supplied to the controllers from an onboard power supply system, usually via what are known as terminals. In this case, controllers can be supplied with power from an onboard power supply system only when required or constantly.

In the case of constantly supplied controllers, there is the problem that such controllers are a constant load on the energy stores in the motor vehicle, particularly the onboard power supply system battery, which can result in the onboard power supply system battery being drained completely. Methods for network management have therefore been developed which can put controllers into a switched-off state or a sleep state when required, from which state they can then be awoken. Switching off or putting controllers into a sleep state allows a reduction in energy consumption by the controllers, which relieves the load on the onboard power supply system battery.

With the aim of further energy saving, methods are currently being developed for operating networks in what is known as a partial network mode. In this case, it is meant to be possible to specifically connect and disconnect selected controllers, and hence to allow them to communicate with one another only as required, even during a driving mode of the motor vehicle. However, implementing such a partial network mode requires complex logic to be integrated into the transceiver chips and controllers of the respective bus system. In addition, suitable control is necessary for coordinating the network state. This increases the system complexity, which is high anyway, and creates an increased potential for error.

In contrast to CAN, FlexRay and LIN bus systems, Ethernet allows DC-free communication. In bus systems implemented by Ethernet, it is therefore possible for a communication signal, usually an AC voltage signal, to be modulated onto a DC voltage without needing to fear losses in a quality of the communication. DE 10 2008 030 222 A1 discloses a controller for communicating with a differential bus system, wherein the controller comprises a coupling unit for supplying and/or detecting a signal, the coupling unit using a common potential with a further unit connected to the bus system.

When controllers are supplied with power from an onboard power supply system, there may be a need to transform a voltage level of the onboard power supply system voltage to a voltage level of an operating voltage for the respective controller. For such a transformation, it is possible to use what are known as switched-mode regulators and what are known as in-phase regulators, inter alia. In a switched-mode regulator, an input voltage for the switched-mode regulator is periodically switched on and off and passed to a storage element. Depending on the ratio of switched-on to switched-off time, a particular average voltage is established at the output of the switched-mode regulator or the storage element. An advantage in this context is low power loss, but disadvantages are a high level of circuit complexity and EMC disturbances as a result of fast switching operations.

By contrast, in-phase regulators afford the advantage of a lower-disturbance output voltage, but have poorer efficiency than switched-mode regulators on account of relatively great heat loss. However, there is the problem that when the controllers are supplied with power from an onboard power supply system, it is necessary for each controller to have at least one of the regulators described above associated with it.

SUMMARY The technical problem which arises is that of providing a network and a method for operating a network which ensures a reduction in network elements, particularly elements for wiring, and allows a simple and safe and also energy-saving partial network mode.

The solution to the technical problem is obtained from the subjects having the features of the claimed invention Disclosed embodiments provide a network, particular a network in a motor vehicle. In this case, the network may be a DC-free network, particular an Ethernet network.

BRIEF DESCRIPTION OF THE DRAWINGS

The invention is explained in more detail with reference to a plurality of disclosed embodiments. In the figures.

DETAILED DESCRIPTION OF THE DISCLOSED EMBODIMENTS

Figure 1:
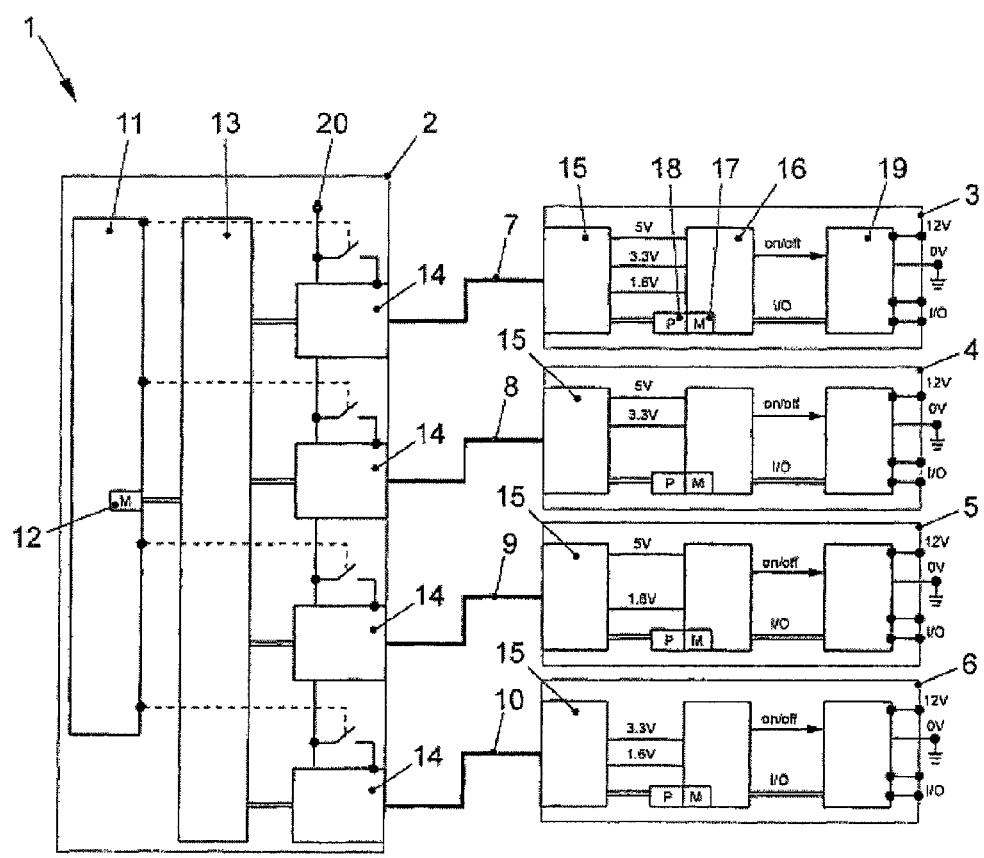
FIG. 1 shows a schematic overview of a network.

In the text which follows, the same reference symbols denote elements having the same or similar technical properties.

In accordance with disclosed embodiments, the network comprises a central subscriber and at least one first subscriber. The central subscriber may in this case be a central controller, particular what is known as a gateway. The first subscriber may be a peripheral controller. It goes without saying that the network may also comprise further subscribers besides the first subscriber. The central subscriber and the at least one first subscriber are connected by at least one first cable. Similarly, further subscribers may be connected to the central subscriber by respective further cables. Overall, this results in what is known as a star topology for the network.

The central subscriber comprises at least one signal coupling unit and at least one energy coupling unit. The signal coupling unit can be used to impress or tap off an AC voltage onto or from at least one first line of the first cable. In this case, the AC voltage is used for transmitting data for communication between the central subscriber and the first subscriber. Communication is possible bidirectionally in this case. When data are sent, the central subscriber, for example, impresses an appropriate AC voltage onto the at least one first line of the first cable. When data are received, the central subscriber taps off the relevant AC voltage from the at least one first line of the first cable.

The energy coupling unit can be used to impress a DC voltage at a predetermined first voltage level onto the first line of the first cable. The AC voltage and the DC voltage may therefore be impressed onto the first line of the first cable simultaneously. It is thus possible for the AC voltage to be modulated onto the DC voltage. In addition, the energy coupling unit may be able to be used to impress a DC voltage at a predetermined further voltage level onto a second line of the first cable. In this case, the first cable thus comprises two lines and may be in the form of two-core cable, for example.

The at least one first subscriber also comprises a signal coupling unit and at least one energy coupling unit. The signal coupling unit can be used to tap off or impress an AC voltage from or onto the at least one first line of the first cable. In this case, the signal coupling unit is used for bidirectional communication for the central subscriber by an AC voltage impressed onto the first line. The energy coupling unit of the first subscriber can be used to tap off the DC voltage, which can be impressed onto the first line of the first cable by the central subscriber, from the at least one first line of the first cable. In addition, the energy coupling unit of the first subscriber can be used to tap off the further DC voltage, which can be impressed onto the second line of the first cable by the central subscriber, from the second line of the first cable. According to at least one disclosed embodiment, the first DC voltage is a first operating voltage for the first subscriber or can be transformed into the first operating voltage for the first subscriber, for example by a voltage transformer, which may be part of the energy coupling unit of the first subscriber. In addition, the first operating voltage can be applied to at least one first input of the first subscriber.

In this case, the first DC voltage is a first operating voltage for the first subscriber or can be transformed into such an operating voltage. It therefore corresponds to a supply voltage that is necessary for operating the subscriber, e.g. a controller, for example a supply voltage of 5 V.

Also according to at least one disclosed embodiment, the further DC voltage is a further operating voltage for the first subscriber or, for example by a voltage transformer, which may be an element of the energy coupling unit of the first subscriber, can be transformed into the further operating voltage. The further operating voltage can likewise be applied to the first or to a further input of the first subscriber. The first predetermined voltage level of the first DC voltage is different than the further predetermined voltage level of the further DC voltage in this case.

In this case, the first subscriber may have a plurality of inputs to which voltages at respective different voltage levels can be applied or which require voltages at different levels. By way of example, the first operating voltage can be used for supplying power to a microcontroller of the first subscriber. The further operating voltage can be used for supplying voltage to memory units of the first subscriber.

It is essential that the first line can be used to transmit a DC voltage at the first predetermined voltage level from the central subscriber to the first subscriber and the second line can be used to transmit a DC voltage at the further predetermined voltage level, the two voltage levels being different.

The further operating voltage can therefore likewise be applied to the first input of the first subscriber only when the further predetermined voltage level of the further DC voltage is transformed, for example by a voltage transformer, which may be part of the energy coupling unit of the first subscriber, to the first predetermined voltage level, that is to say the voltage level of the further operating voltage is the same as the voltage level of the first operating voltage. In this scenario, the effect advantageously achieved is that DC voltages at different voltage levels can be transmitted on both lines. This results in an increase in the line cross section, which means that it is advantageously possible for a higher power to be transmitted from the central subscriber to the first subscriber, particularly to the first input of the first subscriber.

Optionally, however, the voltage level of the further operating voltage is also different than the voltage level of the first operating voltage, with the further operating voltage being able to be applied to a further input of the first subscriber in this scenario. In this example, the first DC voltage may be the first operating voltage and may be able to be applied directly, that is to say without an interposed voltage transformer, to the first input of the first subscriber, and the further DC voltage may be the further operating voltage and may be able to be applied directly, that is to say without an interposed voltage transformer, to a further input of the first subscriber. This advantageously results in the first line of the first cable being able to be used for supplying power to the first input of the first subscriber, for example for supplying power to a microcontroller of the first subscriber, with the second line being able to be used for supplying power to the second input of the first subscriber, for example for supplying power to memory units of the first subscriber.

In a switched-on or awoken state of the first subscriber, power for supplying the first subscriber is transmitted via the same line via which AC voltage signals for communication or data transmission between the subscribers are also transmitted. Hence, the first subscriber advantageously no longer needs to be connected to an onboard power supply system or connected to the latter for the purpose of supplying power. This further advantageously means that switching elements for the electrical connection of the first subscriber to the onboard power supply system, particularly elements for wiring, can be dispensed with. Particularly when the central subscriber is connected to further subscribers besides the first subscriber, a central supply of power to the first and further subscribers can be provided from the central subscriber. This advantageously allows switching elements for electrically connecting the first and further subscribers to the on board power supply system to be dispensed with for the first subscriber and all further subscribers.

In another disclosed embodiment, a voltage level of the further DC voltage corresponds to a ground potential, wherein the further DC voltage can be applied to a ground input of the first subscriber. This advantageously results in the first subscriber not needing to be connected to a vehicle ground connection, since an appropriate ground potential is provided by the central subscriber by the second line of the first cable. Hence, it is possible to avoid complex wiring of the first subscriber to a ground connection on the vehicle or on the onboard power supply system.

It is also possible for the central subscriber to be connected to the first subscriber by a predetermined number of lines, wherein the energy coupling unit of the central subscriber can be used to impress onto at least one line from the predetermined number of lines a DC voltage for which the voltage level corresponds to a ground potential, wherein the energy coupling unit of the first subscriber can be used to tap off this DC voltage from the at least one line from the predetermined number of lines and to apply it to a ground input of the first subscriber. In this case, the remaining lines from the predetermined number of lines are used for transmitting at least two DC voltages at different voltage levels.

By way of example, it is thus conceivable for the central subscriber and the first subscriber to be electrically connected by two two-core cables, that is to say by four lines. In this case, the energy coupling unit of the central subscriber can be used to impress a DC voltage onto each of three lines, that is to say a total of three DC voltages, which can be tapped off by the energy coupling unit of the first subscriber, wherein at least two of the three, but optionally all three, DC voltages are at different voltage levels. The energy coupling unit of the central subscriber can be used to impress a DC voltage to which the voltage level corresponds to a ground potential onto the fourth, remaining line, wherein the energy coupling unit of the first subscriber can be used to tap off this DC voltage from the fourth line and to apply it to a ground input of the first subscriber.

In still another disclosed embodiment, the energy coupling unit of the first subscriber comprises at least one voltage transformer, wherein the at least one voltage transformer can be used to alter the voltage level of the first or the further operating voltage. The first operating voltage with the altered voltage level can be applied to at least one further input of the first subscriber. If the first subscriber comprises a first input for supplying power to a microcontroller and a second input for supplying power to memory units, for example, then the voltage transformer can be used to transform the DC voltage tapped off from the first line of the first cable as a first operating voltage, for example, such that it can be applied to the second input, which means that power for supplying the memory units can likewise be transmitted via the first line of the first cable. It goes without saying that the energy coupling unit of the first subscriber may comprise further voltage transformers which can be used to transform the first operating voltage to a voltage level for further inputs of the first subscriber.

Similarly, the second operating voltage with the altered voltage level can be applied to the first or to at least one further input of the first subscriber.

In yet another disclosed embodiment, the first subscriber comprises a signaling unit or the first subscriber has an associated signaling unit, wherein a signaling unit can be used to produce a requirement signal in a disconnected or sleeping state of the first subscriber. The requirement signal can be transmitted from the signaling unit to the central subscriber via at least one line connecting the first and central subscribers. By way of example, the requirement signal may be able to be transmitted via the first and/or the second line and/or a further line connecting the first and central subscribers.

A sleep state (sleep mode) denotes an energy-saving state of the first subscriber. In this case, the first subscriber is supplied with power such that when it is awoken from the sleep state it is put into an operating state which is the same as the operating state which the first subscriber was in when this sleep state was activated. This forms the essential difference in comparison with the disconnected state of the subscriber. When connected from the disconnected state, the first subscriber is put into an initial state, which usually does not correspond to the operating state in which the first subscriber was disconnected. An energy requirement for the first subscriber in the disconnected state is also lower than in the sleep state.

In this case, the requirement signal is used for signaling a communication requirement of the first subscriber. In a disconnected state or sleep state, the energy consumption of the first subscriber is thus reduced in comparison with an operating or communication state, but no communication can take place between the central subscriber and the first subscriber. If the first subscriber needs to communicate in such a state, the first subscriber needs to be awoken from the disconnected state or sleep state. According to the disclosed embodiments, the awaking can also or exclusively be initiated upon signaling of a communication requirement by the first subscriber. This so-called reverse waking advantageously allows the network to be operated in the "partial network mode" in a manner which is simple and, from the point of view of control logic, uninvolved. In this case, the term reverse waking comprises awaking or connection upon signaling of a communication requirement of the first subscriber.

By way of example, a requirement signal can be produced when a communication requirement of the first subscriber is detected. By way of example, a communication requirement of the first subscriber can be obtained as a result of evaluation of signals from a sensor which is directly associated with the first subscriber. By way of example, a direct association can be understood to mean that the sensor is connected to an input interface of at least the first subscriber physically, for example by at least one line. In this case, the sensor may be connected directly to the input interface of at least the first subscriber, i.e. signals from the sensor are transmitted to the first subscriber directly and not to the first subscriber via further subscribers, as in the case of a bus system, for example. The sensor may also be hard wired to the first subscriber. A direct association can also be understood to mean that the sensor is connected exclusively to the first subscriber physically, for example by at least one line.

In this case, the sensor may also be an operator control element which can be controlled manually, e.g. by a motor vehicle driver. By way of example, the sensor may be an operator control element for an electric window lifter, the operator control element being physically connected to a controller for the servomotor for the purpose of adjusting the window pane. In this case, the controller for the servomotor is the first subscriber. When a motor vehicle driver operates the operator control element, for example, a communication requirement of the first subscriber is detected and therefore a requirement signal is produced.

The production of a requirement signal as initiated from an evaluation of signals from a sensor which is directly associated with the first subscriber advantageously allows the implementation of reverse waking which is independent of central logic. In particular, the sensor no longer needs to be connected to a central control unit, for example the central subscriber, physically, for example by lines, so that a communication requirement can be established and the first subscriber can be awoken.

In a further disclosed embodiment, the central subscriber can be used to detect the requirement signal, wherein the energy coupling unit of the central subscriber is used to impress the first DC voltage onto the first line of the first cable and the further DC voltage onto the second line of the first cable when the requirement signal is detected. The impressing of the first DC voltage switches on the first subscriber from a disconnected state or awakes it from a sleep state. With further advantage, this results in the first subscriber being supplied with the first operating voltage by the central subscriber, that is to say switched on or awoken, only when the central subscriber detects the requirement signal.

The energy coupling unit of the central subscriber may also be able to be used to impress further DC voltages on to a predetermined number of lines which connect the central and first subscribers, wherein at least two of the DC voltages that can be impressed are at different voltage levels when the requirement signal is detected. In particular, a DC voltage for which the voltage level corresponds to a ground potential may be able to be impressed onto at least one line from the predetermined number of lines when the requirement signal is detected.

In yet another disclosed embodiment, the signaling unit can be used to produce a requirement voltage at a predetermined voltage level as a requirement signal, wherein the energy coupling unit of the first subscriber can be used to impress the requirement voltage onto at least one line connecting the first and central subscribers. In particular, the requirement voltage may be a DC voltage. This advantageously results in the requirement signal being able to be transmitted via already available elements for electrical connection between the central subscriber and the first subscriber.

In still another disclosed embodiment, the energy coupling unit of the central subscriber can be used to tap off the requirement voltage from the first line and to apply it to a detection input of the central subscriber. An evaluation unit of the central subscriber can be used to evaluate whether the voltage applied to the detection input exceeds a predetermined voltage level. In addition, the energy coupling unit of the central subscriber can be used to impress the first DC voltage onto the first line of the first cable and the further DC voltage onto the second line of the first cable when the voltage applied to the detection input exceeds the predetermined voltage level. This advantageously results in an easy-to-implement manner of operation for the reverse waking described above. Particularly by comparing the transmitted requirement voltage within a predetermined voltage level, it is possible to implement waking or connection which is more independent of spurious voltages.

In at least one disclosed embodiment, a level of the requirement voltage is lower than a level of the first operating voltage for the first subscriber and/or of an operating voltage for the central subscriber. If a level of the first operating voltage for the first subscriber is 5 V, for example, a level of the requirement voltage may be 2 V, for example. If a level of the requirement voltage is lower than a level of an operating voltage for the central subscriber, the requirement voltage cannot be used to awake or switch on the central subscriber and particularly cannot be used to supply power to the central subscriber. In this case, the central subscriber thus cannot be supplied with power by the requirement voltage or a DC voltage transmitted from the first subscriber to the central subscriber. A level of the requirement voltage may also be lower than the levels of all the operating voltages for the first subscriber. This advantageously results in less power for signaling a communication requirement needing to be transmitted from the first subscriber to the central subscriber, which means that the reverse waking is of energy saving design.

In a further disclosed embodiment, the signaling unit of the first subscriber comprises at least one switching unit. By the switching unit, the signaling unit can be connected to a voltage source. In this case, the voltage source may be a battery or a storage battery, the output voltage of which is at the level of the requirement voltage. The signaling unit may also additionally comprise at least one voltage transformer, wherein the voltage transformer can be connected to the voltage source by the switching unit. In this case, an output voltage from the voltage source may be higher or lower than the level of the requirement voltage. In this case, the voltage source may be the onboard power supply system or the onboard power supply system battery, for example. The voltage transformer can be used to convert a level of the output voltage from the voltage source to the level of the requirement voltage. The requirement voltage is thus then applied to at least the first line of the first cable when the switching unit sets up an electrical connection between the signaling unit and the voltage source. In this case, the switching unit can be controlled by a control unit, wherein the control unit evaluates signals from a sensor, for example, which is directly associated with the first subscriber. It is also possible for the switching unit to be directly connected to the sensor which is directly associated with the first subscriber. This advantageously results in a requirement signal being able to be transmitted to the central subscriber independently of a state of the first subscriber, particularly independently of a switched-off state or a sleep state of the first subscriber.

The lines of the first cable and possibly of further cables are used primarily for communication between the central subscriber and the first subscriber. When the first and second DC voltages are impressed by the central subscriber onto the first and second lines of the first cable, it should be noted that the applied operating voltage needs to be chosen on the basis of a DC resistance, a length and a current flow through the first and second lines. In particular, a first and a further DC voltage impressed by the central subscriber should be chosen such that a voltage drop across the first and second lines is taken into account.

In this case, the voltage transformer may be an in-phase regulator as explained above. In particular, the voltage transformer, particularly the in-phase regulator, can be used to lower the voltage level of the DC voltage tapped off from the first line of the first cable.

Disclosed embodiments also provide a method for operating a network, particularly in a motor vehicle. In this case, the network is designed in accordance with the embodiments of the network which are outlined above.

FIG. 1 shows a network 1 according to the disclosed embodiments. The network 1 comprises a central subscriber 2, which can also be called a gateway. In addition, the network 1 comprises a first subscriber 3, a second subscriber 4, a third subscriber 5 and a fourth subscriber 6. The central subscriber 2 is connected to the first subscriber 3 by a first cable 7. Similarly, the central subscriber 2 is connected to the subscribers 4, 5, 6 by a second cable 8, a third cable 9 and a fourth cable 10. The central subscriber 2 therefore serves as a star point in what is known as a star topology. The central subscriber 2 comprises a microcontroller 11 having what is known as an MAC unit (media access control unit) 12. In addition, the central subscriber 2 comprises an Ethernet switch 13 and, for each further subscriber 3, 4, 5, 6 connected to the central subscriber 2, an energy coupling unit 14, which is in the form of a DC voltage coupler.

A design for a further subscriber 3, 4, 5, 6 is explained by way of example in the design of the first subscriber 3. The first subscriber 3 likewise comprises an energy coupling unit 15, which is likewise in the form of a DC voltage coupler. In addition, the first subscriber 3 comprises a microcontroller 16 having an internal MAC unit 17, to which a physical layer 18 of the network, that is to say of the Ethernet, is connected. In addition, the first subscriber 3 comprises a controller peripheral area 19 for executing predetermined applications. The MAC unit 17 of the first subscriber 3, which MAC unit is contained in the microcontroller 16, regulates Ethernet communication with the central subscriber 2.

In the transmission direction, the Ethernet switch 13 of the central subscriber 2 converts digital signals from the MAC unit 12 into analog transmission signals and distributes them over the respective communication paths, which are shown as cables 7, 8, 9, 10, using what is known as point-to-point communication. In the subscribers 3, 4, 5, 6, the physical layer 18 digitizes these analog signals again. The microcontroller 11 of the central subscriber 2 has network information available in it. From this information, it is possible to infer a communication requirement for the further subscribers 3, 4, 5, 6. On the basis of this network information, the further subscribers 3, 4, 5, 6 can be specifically switched on or off as required. This switching-on or switching-off is effected by connecting or disconnecting a DC voltage that can be coupled onto the lines 21, 22 (for example see FIG. 4) of the cables 7, 8, 9, 10 by the energy coupling units 14.

In the connected state of the further subscribers 3, 4, 5, 6, DC voltages at different voltage levels on which the Ethernet communication has been superimposed have been impressed onto the lines 21, 22 of the cables 7, 8, 9, 10. At the receiver, for example the first subscriber 3, the DC voltages are isolated from the communication signal in the energy coupling unit 15. In this case, the DC voltages are used for supplying power to the microcontroller 16, with the communication signal (Ethernet signal) being supplied to the MAC unit 17. When required, the microcontroller 16 can connect the controller peripheral area 19 and hence control the input/output interface (I/O interface) of the first subscriber 3, for example.

In this case, the energy coupling units 14 couple a first DC voltage at a first predetermined voltage level onto the first line 21 and a second DC voltage at a second predetermined voltage level onto the second line 22 of the cables 7, 8, 9, 10, the DC voltages being provided by a central voltage source 20. The impressed DC voltages are respectively used as a first and a second operating voltage for the further subscribers 3, 4, 5, 6. In this context, the first subscriber 3 is shown to require a first operating voltage at a level of 5 V, a second operating voltage at a level of 3.3 V and a third operating voltage at a level of 1.6 V. The second subscriber 4 requires a first operating voltage at a level of 5 V and a second operating voltage at a level of 3.3 V. The third subscriber 5 requires a first operating voltage at a level of 5 V and a second operating voltage at a level of 1.6 V. The fourth subscriber 6 requires a first operating voltage at a level of 3.3 V and a second operating voltage at a level of 1.6 V. In this case, the energy coupling units 14 of the central subscriber and/or the energy coupling units 15 of the further subscribers 3, 4, 5, 6 may comprise voltage transformers which can be used to match the voltage provided by the central voltage source 20 to the required operating voltages of the further subscribers 3, 4, 5, 6.

If no DC voltage has been impressed onto the lines 21, 22 of the cables 7, 8, 9, 10, the controller peripheral area 19 is also completely disconnected. In this case, a quiescent current may be 0 A. Such network management is therefore advantageously very energy efficient. In this case, central logic for the network management is integrated in the central subscriber, which advantageously reduces complexity for the network management and increases robustness of the network. Since the combination of active and disconnected further subscribers 3, 4, 5, 6 can be chosen arbitrarily, it is therefore advantageously possible to implement any desired partial network mode.

Figure 2:
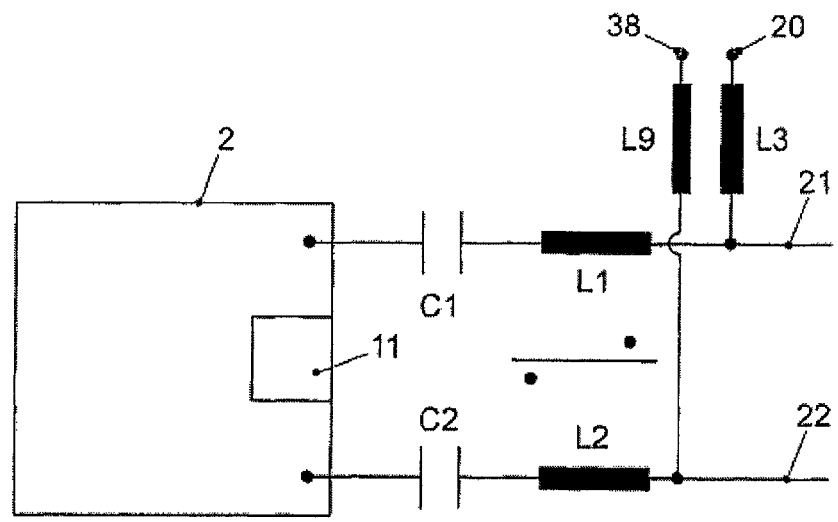
FIG. 2 shows a schematic illustration of a central subscriber.

FIG. 2 shows a schematic view of a central subscriber 2. In this case, particularly the impressing of an AC voltage and of a first and a second DC voltage by the central subscriber 2 onto a first line and a second line 21, 22 of a first cable 7 (see FIG. 1) is shown. In this case, a signal coupling unit of the central subscriber 2 comprises a first capacitance C1, a second capacitance C2, a first inductance L1 and a second inductance L2. In this case, the first capacitance C1 and the first inductance L1 are arranged in the first line 21 of the first cable 7. In addition, the second capacitance C2 and the second inductance L2 are arranged in a second line 22 of the first cable 7. The microcontroller 11 and the MAC unit 12 and Ethernet switches 13, which are not shown in FIG. 2, can be used to impress an AC voltage onto the first and second lines 21, 22. In this case, the capacitors C1, C2 are used for decoupling the central subscriber 2 from a DC voltage which needs to be impressed onto the first line 21. In this case, the inductances L1, L2 are used as a common mode choke. This common mode choke has a plurality of identical, but bifilarly wound, windings which carry an operating current in opposite senses. The magnetic fields of the windings in the core of the common mode choke cancel each other out. In this case, the common mode choke is used for attenuating spurious emissions (EMI). The energy coupling unit 14 of the central subscriber 2 comprises an inductance L3 and an inductance L9, wherein the inductance L3, which is used for blocking high frequencies of the AC voltage used for communication, can be used to apply a first DC voltage, for example 5 V, to the first line 21. FIG. 2 shows that the first DC voltage is provided by the central voltage source 20. The inductance L9, which is likewise used for blocking high frequencies of the AC voltage used for communication, can be used to apply a second DC voltage, for example 3.3 V, to the second line 22. FIG. 2 shows that the second DC voltage is provided by a further central voltage source 38.

Figure 3:
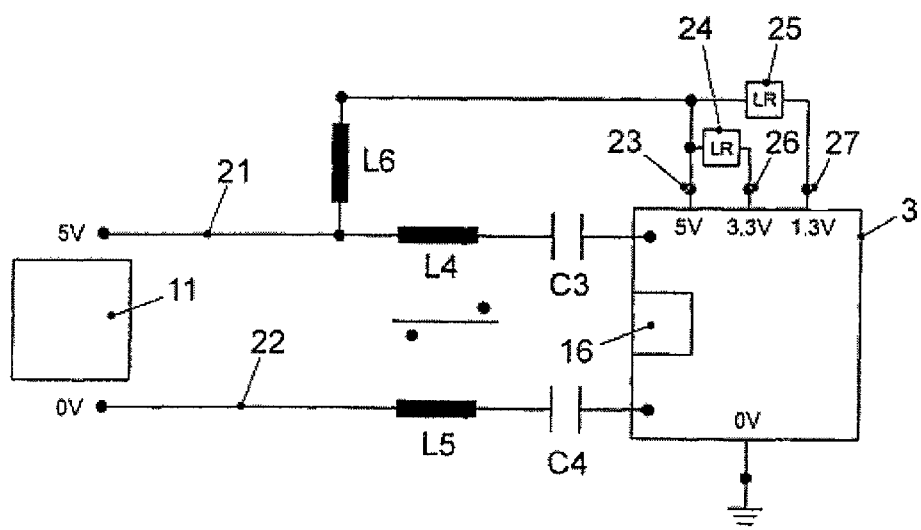
FIG. 3 shows a schematic illustration of a first subscriber.

FIG. 3 schematically shows a first subscriber 3. In this case, a signal coupling unit of the first subscriber 3 comprises, in a manner similar to the signal coupling unit of the central subscriber 2, a first capacitance C3 and a second capacitance C4 for the signal coupling unit of the first subscriber 3. In addition, this signal coupling unit comprises a first inductance L4 and a second inductance L5 for the signal coupling unit of the first subscriber 3. In this case, the capacitances C3, C4 and the inductances L4, L5 exercise the same functionality as the previously explained capacitances C1, C2 and inductances L1, L2 of the signal coupling unit of a central subscriber 2. An energy coupling unit 15 of the first subscriber 3 comprises, inter alia, a coil L6 which is used to tap off a first DC voltage from the first line 21. This figure shows that the first DC voltage tapped off in this manner is applied to a first input 23 of the first subscriber 3, that is to say corresponds to a first operating voltage for the first subscriber 3. In addition, the energy coupling unit 15 comprises a first in-phase regulator 24 and a second in-phase regulator 25. The first in-phase regulator 24 is used to convert the first DC voltage impressed onto the first line 21, which DC voltage simultaneously corresponds to the first operating voltage, to a voltage level of 3.3 V and to apply it to a second input 26 of the first subscriber 3. The second in-phase regulator 25 is used to transform a voltage level of the first DC voltage impressed onto the first line 21 from 5 V to a voltage level of 1.3 V and to apply it to a third input 27 of the first subscriber. Hence, three inputs of the first subscriber 3 can be supplied with a customized operating voltage by the DC voltage transmitted via the first line 21. FIG. 3 shows that a second DC voltage at a voltage level of 0 V has been impressed onto a second line 22 of the first cable 7.

Figure 4:
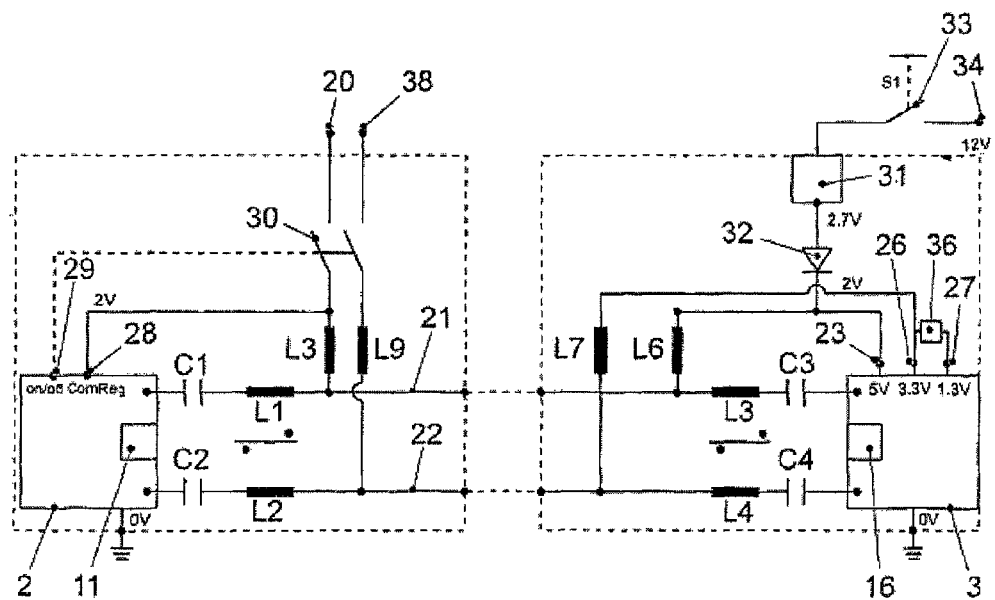
FIG. 4 shows a schematic illustration of a central subscriber and a first subscriber.
Figure 6:
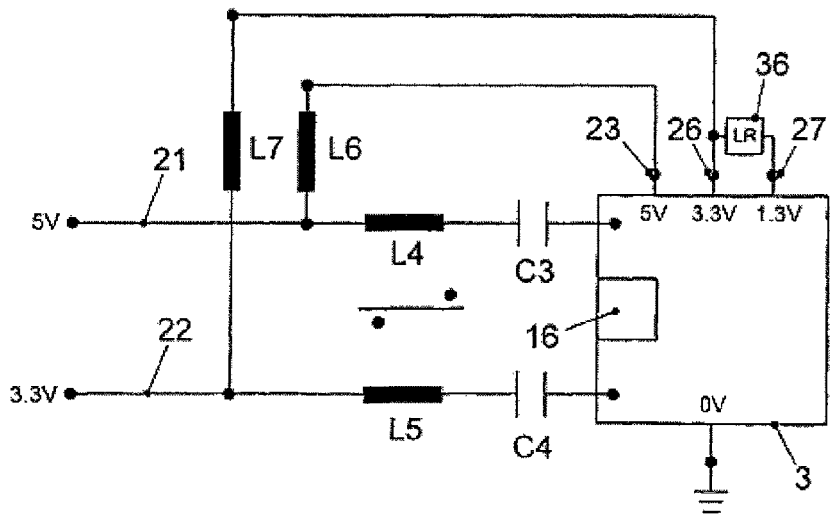
FIG. 6 shows a schematic illustration of yet another disclosed embodiment of a first subscriber.

FIG. 4 shows a schematic interconnection of a central subscriber 2 and a first subscriber 3, with "reverse waking"

being explained with reference to the circuit shown in FIG. 4. The central subscriber 2 has a detection input 28. The detection input can be used to tap off a voltage impressed on a first line 21. In addition, the central subscriber 2 has a switching output 29. The switching output 29 can be used to switch a switch 30 which connects a central voltage source 20 to a first line 21 via an inductance L3 and a further central voltage source 38 to a second line 22 via an inductance L9. In this case, the first subscriber 3 is designed as shown in FIG. 6. In addition, a signaling unit of the first subscriber 3 has a voltage transformer 31 and also a diode 32. In addition, the signaling unit has a switch 33. The switch 33 can be used to electrically connect the voltage transformer 31 to an onboard power supply system 34. In this case, the voltage transformer 31 transforms the level of an onboard power supply system voltage at a level of 12 V, for example, to a lower level, e.g. 2.7 V. In addition, what is known as a forward voltage for the diode 32 at a predetermined level, e.g. 0.7 V, drops across the diode 32. If the switch 33 is closed, the first line 21 is connected to the onboard power supply system via the inductance L6, the diode 32, the voltage transformer 31 and the switch 33. The voltage transformer 31 and the diode 32 transform the level of the onboard power supply system voltage down to a level of a requirement voltage, e.g. 2 V. The requirement voltage at a level of 2 V is then impressed onto the first line 21. In this case, the requirement voltage is used as a requirement signal, with the requirement signal being able to transmit a communication requirement to the central subscriber 2 in a disconnected or sleeping state of the first subscriber 3. In a sleeping or disconnected state of the first subscriber 3, the switch 30 is open, i.e. no operating voltage for the first subscriber 3 is impressed onto the first line 21. Hence, no voltage is impressed on the first line 21. When the switch 33 of the signaling unit of the first subscriber 3 is closed, the requirement voltage at the predetermined voltage level is impressed onto the first line 21. The detection input 28 of the central subscriber 2 is used to tap off this requirement voltage from the first line 21 via the inductance L3. An evaluation unit, not shown, which may be integrated in the microcontroller 11 of the central subscriber 1, for example, is used to evaluate whether the voltage applied to the detection input 28 exceeds a predetermined voltage level, particularly the predetermined voltage level of the requirement voltage. If the voltage applied to the detection input 28 does exceed the predetermined voltage level, the switching output 29 is used to control the switch 30 such that it is closed and the central voltage source 20 is coupled to the first subscriber 3 via the inductance L3. This impresses a first DC voltage at a voltage level of 5 V, for example, onto the first line 21 and a second DC voltage at a voltage level of 3.3 V, for example, onto the second line 22 and supplies the first subscriber 3 with a first operating voltage and with a second operating voltage. At the same time, the switch 33 can be opened again.

Figure 5:
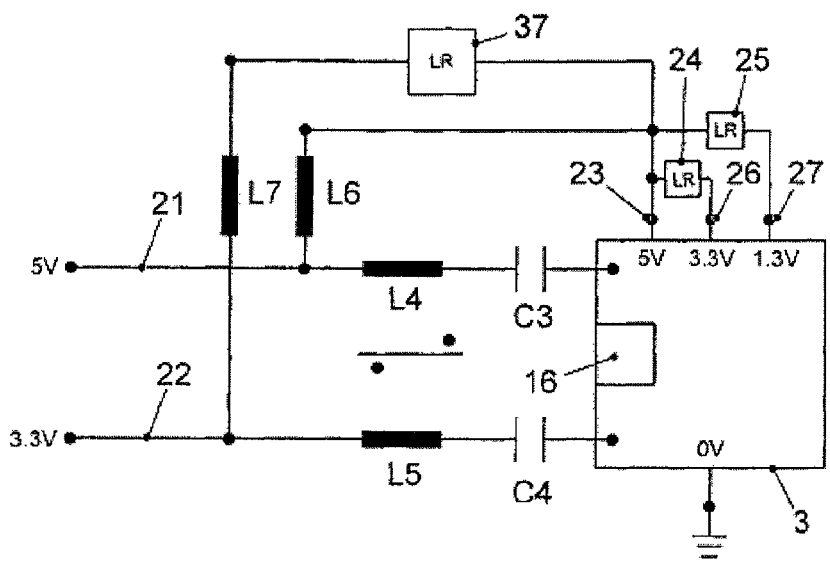
FIG. 5 shows a schematic illustration of another disclosed embodiment of a first subscriber.

FIG. 5 shows a schematic block diagram of the supply of voltage to a first subscriber 3 by a first and a second line 21, 22 of a first cable 7 (see FIG. 1). In this case, the first subscriber 3 is designed as shown in FIG. 3. In addition, however, the first input 23 of the first subscriber 3 and also the first and second in-phase regulators 24, 25 are electrically connected to the second line 22 of the first cable 7 via an inductance L7 and a further in-phase regulator. The second line 22 can have a second DC voltage at a level of 3.3 V impressed onto it by an energy coupling unit 14 of a central subscriber 2 (see FIG. 1), the second DC voltage being transformed to a voltage level of the first operating voltage (5 V) by the further in-phase regulator 37. This advantageously results in an increase in the conductor cross section, since a current for supplying power to the first subscriber 3 can also flow to the first subscriber 3 via the second line 22 in addition to the first line 21.

FIG. 6 shows a supply of voltage to a first input of a first subscriber 3 via a first line 21 and also a supply of voltage to a second and a third input 26, 27 at a lower voltage level by a second line 22. In this case, the figure shows that, by way of example, the energy coupling unit 14 of a central subscriber 2 (see FIG. 1) is used to impress a first DC voltage, e.g. at a level of 5 V, onto the first line 21, wherein the first DC voltage corresponds to a first operating voltage for the first subscriber 3. This voltage is tapped off from the first line 21 via an inductance L6 and is applied to a first input 23 of the first subscriber 3. The energy coupling unit 14 or a further energy coupling unit of the central subscriber 2 is used to impress a second DC voltage, which is lower than the first DC voltage, onto the second line 22. This voltage is tapped off from the second line 22 via an inductance L7 and is applied to a second input 26 of the first subscriber. Hence, the second DC voltage thus corresponds to a second operating voltage for the first subscriber 3. An in-phase regulator 36 can be used to transform the second operating voltage tapped off from the second line 22 to a voltage level that is lower in comparison with this second operating voltage and to apply it to a third input 27 of the first subscriber 3.

Figure 7:
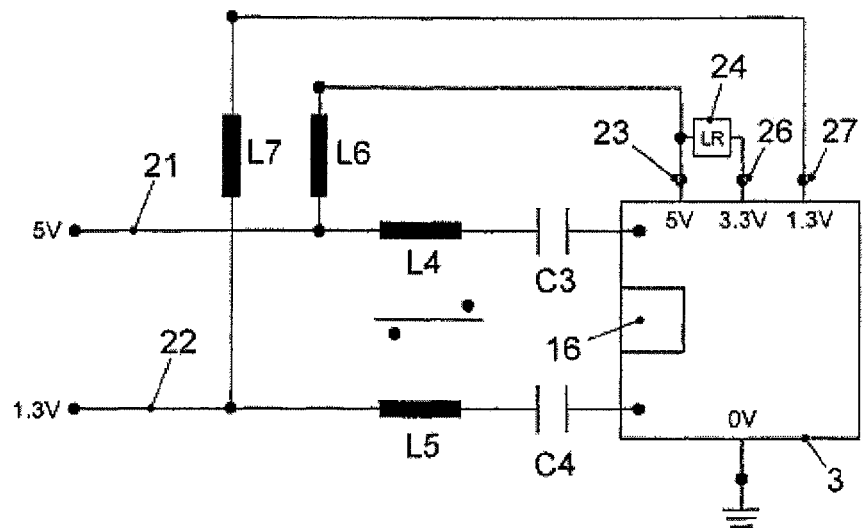
FIG. 7 shows a schematic illustration of a further disclosed embodiment of a first subscriber.

In contrast to FIG. 6, FIG. 7 shows that the first operating voltage at a level of 5 V that is tapped off from the first line 21 is applied firstly to the first input 23 of the first subscriber 3 and, via a first in-phase regulator 24, to a second input 26 of the first subscriber 3. A second DC voltage, which is lower in comparison with the first DC voltage, which corresponds to the first operating voltage, e.g. at a level of 1.3 V, is impressed onto the second line 22 of the first cable 7 shown in FIG. 1. An inductance L7 is used to tap off the second DC voltage from the second line 22 and to apply it to a third input 27 of the first subscriber 3. Advantageously, the second DC voltage tapped off from the second line 22, which corresponds to a second operating voltage, is used as a preservation voltage for registers or memory states. Hence, in the disclosed embodiment as shown in FIG. 7, it is advantageously possible to disconnect the operating voltage for the first and second inputs 23, 26 of the first subscriber 3 and then just to use the second line 22 to provide the second operating voltage. In this way, the information stored in the processors or memory can be preserved. This can also be called a "freeze state". In such a case, the first subscriber 3 can quickly be put back into its previous state (state at disconnection or falling asleep) when the first DC voltage at a level of 5 V is connected. It would therefore be possible to dispense with time-consuming booting or initialization.

Figure 8:
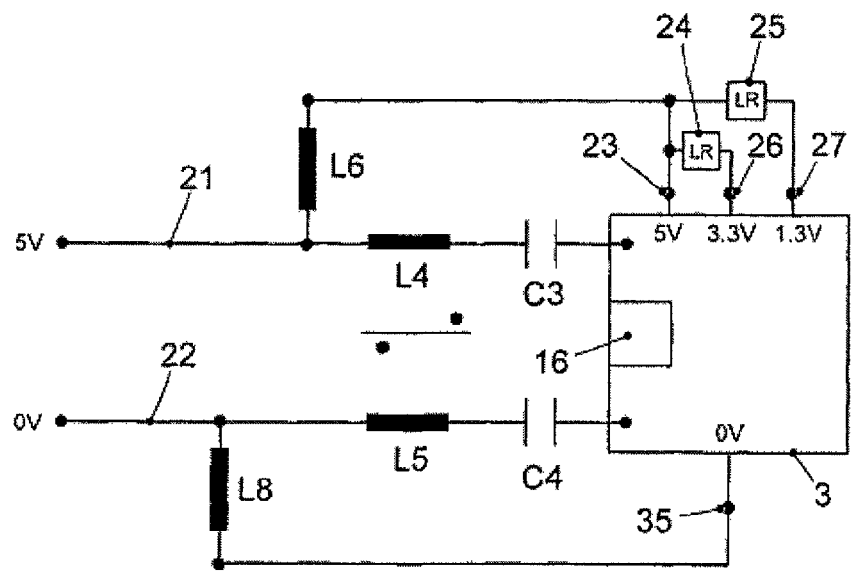
FIG. 8 shows a schematic illustration of still another disclosed embodiment of a subscriber.

In contrast to FIG. 6 and FIG. 7, FIG. 8 shows that a first line 21 is used to impress a first DC voltage at a level of 5 V and a second line 22 has a second DC voltage at a level of 0 V impressed onto it. In this case, the second line 22 is at a ground potential, particularly a potential of a vehicle ground. An inductance L8 can be used to tap off this ground potential from the second line 22 and to apply it to a ground input 35 of a first subscriber 3. This advantageously allows the operation of a first subscriber 3 without a separate connection to a vehicle ground.

LIST OF REFERENCE SYMBOLS

1 Network
2 Central subscriber
3 First subscriber
4 Second subscriber
5 Third subscriber 6 Fourth subscriber
7 First cable
8 Second cable
9 Third cable
10 Fourth cable
11 Microcontroller
12 MAC unit
13 Ethernet switch
14 Energy coupling unit
15 Energy coupling unit
16 Microcontroller
17 MAC unit
18 Physical layer
19 Controller peripheral area
20 Central supply voltage
21 First line
22 Second line
23 First input
24 First in-phase regulator
25 Second in-phase regulator
26 Second input
27 Third input
28 Detection input
29 Switching output
30 Switch
31 Voltage transformer
32 Diode
33 Switch
34 Onboard power supply system voltage
35 Ground input
36 In-phase regulator
37 In-phase regulator
38 Further central voltage source
C1 First capacitance
C2 Second capacitance
C3 First capacitance
C4 Second capacitance
L1 First inductance
L2 Second inductance
L3 Inductance
L4 First inductance
L5 Second inductance
L6 Inductance
L7 Inductance
L8 Inductance
L9 Inductance

The invention claimed is:

1. A network in a motor vehicle, wherein the network comprises;
a central subscriber; and
at least one first subscriber,
wherein the central subscriber and the at least one first subscriber are connected by at least one first cable,
wherein the central subscriber comprises at least one signal coupling unit and at least one energy coupling unit,
wherein the signal coupling unit is used to impress or to tap off an AC voltage onto or from at least one first line of the first cable,
wherein the energy coupling unit is used to impress a first DC voltage at a first predetermined voltage level onto the first line of the first cable and a further DC voltage at a further predetermined voltage level onto a second line of the first cable,
wherein the at least one first subscriber comprises at least one signal coupling unit and at least one energy coupling unit,
wherein the signal coupling unit is used to tap off or to impress an AC voltage from or onto the at least one first line of the first cable,
wherein the energy coupling unit is used to tap off the first DC voltage from the first line of the first cable and the further DC voltage from the second line of the first cable,
wherein the first DC voltage is a first operating voltage for the first subscriber or is transformed into the first operating voltage for the first subscriber,
wherein the first operating voltage is applied to at least one first input of the first subscriber,
wherein the further DC voltage is a further operating voltage for the first subscriber or is transformed into the further operating voltage,
wherein the further operating voltage can be applied to the first input or to a further input of the first subscriber, and
wherein the first predetermined voltage level of the first DC voltage is different than the further predetermined voltage level of the further DC voltage.

2. The network of claim 1, wherein a voltage level of the further DC voltage corresponds to a ground potential, wherein the further DC voltage is applied to a ground input of the first subscriber.

3. The network of claim 1,
wherein the energy coupling unit of the first subscriber comprises at least one voltage transformer,
wherein the at least one voltage transformer is used to alter the voltage level of the first or the further operating voltage,
wherein the first operating voltage with the altered voltage level is applied to a further input of the first subscriber, and
wherein the further operating voltage with the altered voltage level is applied to the first input or to a further input of the first subscriber.

4. The network of claim 1, wherein the first subscriber comprises a signaling unit,
wherein the signaling unit is used to produce a requirement signal in a disconnected or sleeping state of the first subscriber, and
wherein the requirement signal is transmitted from the signaling unit to the central subscriber via at least one line connecting the first and central subscribers.

5. The network of claim 4, wherein the central subscriber is used to detect the requirement signal, and wherein the energy coupling unit of the central subscriber used to impress the first DC voltage onto the first line of the first cable and the further DC voltage onto the second line of the first cable when the requirement signal is detected.

6. The network of claim 4, wherein the signaling unit is used to produce a requirement voltage at a predetermined voltage level as a requirement signal, and wherein the energy coupling unit of the first subscriber can be used to impress the requirement voltage onto a line connecting the first and central subscribers.

7. The network of claim 6, wherein the energy coupling unit of the central subscriber is used to tap off the requirement voltage from the line connecting the first and central subscribers and to apply the requirement voltage to a detection input of the central subscriber, wherein an evaluation unit of the central subscriber used to evaluate whether the voltage applied to the detection input exceeds a predetermined voltage level, and wherein the energy coupling unit of the central subscriber is used to impress the first DC voltage onto the first line of the first cable and the further DC voltage onto the second line of the first cable when the voltage applied to the detection input exceeds the predetermined voltage level.

8. The apparatus of claim 6, wherein a level of the requirement voltage is lower than a level of the first operating voltage for the first subscriber and/or of an operating voltage for the central subscriber.

9. The network of claim 6, wherein the signaling unit of the first subscriber comprises at least one switching unit, wherein the signaling unit is connected to a voltage source by the switching unit.

10. A method for operating a network in a motor vehicle, wherein the network comprises a central subscriber and at least one first subscriber, the method comprising:
- connecting the central subscriber and the at least one first subscriber by at least one first cable, wherein the central subscriber comprises at least one signal coupling unit and at least one energy coupling unit;
- using, in a communication state of the first subscriber, the signal coupling unit to impress or to tap off an AC voltage onto or from at least one first line of the first cable; wherein
- using the energy coupling unit to impress a first DC voltage at a first predetermined voltage level onto the first line and a further DC voltage at a further predetermined voltage level onto a second line of the first cable, wherein the at least one first subscriber comprises at least one signal coupling unit and at least one energy coupling unit;
- using the signal coupling unit to tap off or to impress an AC voltage from or onto the at least one first line of the first cable;
- using the energy coupling unit to tap off the first DC voltage from the at least one first line and the further DC voltage from the second line of the first cable,
- wherein the first DC voltage is a first operating voltage for the first subscriber or is transformed into the first operating voltage for the first subscriber, the method further comprising:
- applying the first operating voltage to at least one first input of the first subscriber, wherein the further DC voltage is a further operating voltage for the first subscriber or is transformed into the further operating voltage, and
- applying the further operating voltage to the first input or to a further input of the first subscriber,
- wherein the first predetermined voltage level of the first DC voltage is different than the further predetermined voltage level of the further DC voltage.

\* \* \* \* \*